United States Patent
Kumar et al.

(10) Patent No.: US 11,438,872 B2
(45) Date of Patent: Sep. 6, 2022

(54) NARROWBAND INTERNET OF THINGS DEVICES AND METHOD OF OPERATION THEREOF

(71) Applicant: Intel Corporation, Santa Clara, CA (US)

(72) Inventors: Utsaw Kumar, Sunnyvale, CA (US); Debdeep Chatterjee, San Jose, CA (US); Seunghee Han, San Jose, CA (US); Ralf Matthias Bendlin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 977 days.

(21) Appl. No.: 16/071,840

(22) PCT Filed: Sep. 29, 2016

(86) PCT No.: PCT/US2016/054442
§ 371 (c)(1),
(2) Date: Jul. 20, 2018

(87) PCT Pub. No.: WO2017/136003
PCT Pub. Date: Aug. 10, 2017

(65) Prior Publication Data
US 2021/0289470 A1    Sep. 16, 2021

Related U.S. Application Data

(60) Provisional application No. 62/339,633, filed on May 20, 2016, provisional application No. 62/292,042, filed on Feb. 5, 2016.

(51) Int. Cl.
*H04W 72/00*     (2009.01)
*H04W 76/10*     (2018.01)
*H04L 5/00*     (2006.01)

(52) U.S. Cl.
CPC ......... *H04W 72/005* (2013.01); *H04L 5/0053* (2013.01); *H04W 76/10* (2018.02)

(58) Field of Classification Search
CPC .... H04W 72/005; H04W 76/10; H04L 5/0053
See application file for complete search history.

(56) References Cited

U.S. PATENT DOCUMENTS

| 2013/0195072 A1* | 8/2013 | Zhu ...................... H04L 5/0094 370/330 |
| 2016/0050667 A1* | 2/2016 | Papasakellariou .... H04L 5/0053 370/329 |
| 2018/0184390 A1* | 6/2018 | Wu ...................... H04L 27/2613 |

FOREIGN PATENT DOCUMENTS

| WO | WO-2015200804 A1 | 12/2015 |
| WO | WO-2016018469 A1 | 2/2016 |

OTHER PUBLICATIONS

"Considerations on Downlink Design of NB-IoT", R1-156626, 3GPP TSG-RAN WG1 Meeting #83, (Nov. 7, 2015).

(Continued)

*Primary Examiner* — Faruk Hamza
*Assistant Examiner* — Alan L Lindenbaum
(74) *Attorney, Agent, or Firm* — Schwegman Lundberg & Woessner, P.A.

(57) ABSTRACT

Devices and methods of enhancing narrowband communications are generally described. NPSS and NSSS are modulated to include an additional bit that indicates a duplexing scheme, a raster frequency offset (zero or non-zero), an operating mode (in-band or standalone/guard-band) or frame timing used by the eNB. The NPSS modulation uses conjugate ZC sequences multiplied by a cover code for each OFDM symbol. The NMIB may provide additional information related to the operating mode or offset. NSSS cyclic shifts may be used to indicate the offset or TDD/FDD use, as may relative locations of the NPSS and NSSS. The NSSS (Continued)

may use symbol-level modulation and time domain cyclic shifts to indicate the frame timing.

24 Claims, 7 Drawing Sheets

(56) References Cited

OTHER PUBLICATIONS

"Considerations on Synchronization Signal Design of NB-IoT", R1-156625, GPP TSG-RAN WG1 Meeting #83, (Nov. 7, 2015).
"International Application Serial No. PCT/US2016/054442, International Search Report dated Jan. 13, 2017", 3 pgs.
"International Application Serial No. PCT/US2016/054442, Written Opinion dated Jan. 13, 2017", 10 pgs.
"On the synchronization signal design for NB-IoT", R1-157274, 3GPP TSG-RAN WG1 Meeting #83, (Nov. 6, 2015).

* cited by examiner

NARROWBAND INTERNET OF THINGS DEVICES AND METHOD OF OPERATION THEREOF

PRIORITY CLAIM

This application is a U.S. National Stage Filing under 35 U.S.C. 371 from International Application No. PCT/US2016/054442, filed Sep. 29, 2016 and published in English as WO 2017/136003 on Aug. 10, 2017, which claims the benefit of priority to U.S. Provisional Patent Application Ser. No. 62/292,042, filed Feb. 5, 2016, and entitled "OPERATION MODE AND CHANNEL RASTER INDICATION FOR NB-IOT" and U.S. Provisional Patent Application Ser. No. 62/339,633, filed May 20, 2016, and entitled "ENHANCEMENTS TO NARROWBAND SSS FOR NB-IOT," each of which is incorporated herein by reference in its entirety.

TECHNICAL FIELD

Embodiments pertain to radio access networks. Some embodiments relate to narrowband Internet of Things (IoT) communications in cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to narrowband communications in networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. In particular, both typical UEs such as cell phones and cellular Internet of Things (CIoT) UEs currently use 3GPP LTE systems as part of the IoT. The latter such UEs, which may include machine-type communications (MTC) UEs may pose a particular challenge as they typically have smaller batteries and smaller communication range. Examples of such UEs include sensors (e.g., sensing environmental conditions) or microcontrollers in appliances or vending machines. Unfortunately, compatibility issues may arise in the LTE system when narrowband (NB) IoT (NB-IoT) devices are used. In particular, such devices may encounter issues when attempting to initially access the LTE network due to the narrowband nature of system operation, limited to reception or transmission capabilities of these UEs, and need to support enhanced coverage.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
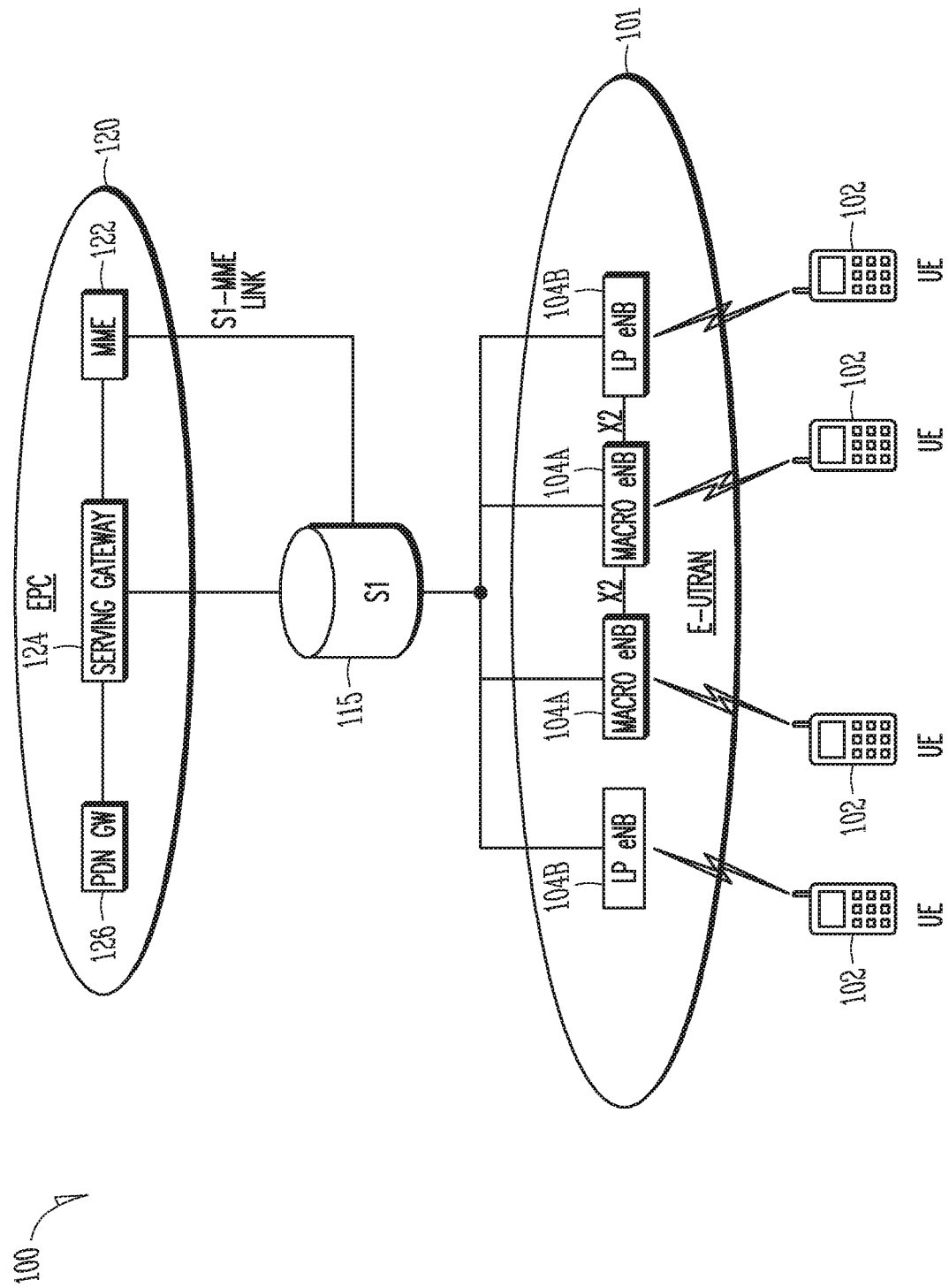
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques as described herein.

The UEs 102 may include cellular Internet of Things (CIoT) UEs. CIoT UEs may comprise a network access layer designed for low-power IoT applications utilizing short-lived UE connections. A CIoT UE can utilize technologies such as machine-to-machine (M2M) or machine-type communications (MTC) for (machine initiated) exchanging data with an MTC server and/or device via a public land mobile network (PLMN), device-to-device (D2D) communication, sensor networks, or IoT networks. An IoT network describes interconnecting uniquely identifiable embedded computing devices (within the internet infrastructure) having short-lived connections, in addition to background applications (e.g., keep-alive messages, status updates, etc.) executed by the CIoT UE.

A UE 102 may perform cell selection upon power-up and cell reselections throughout its operation. The UE 102 searches for a cell. During the cell reselection process, the UE 102 can measure reference signal strength for each neighboring cell (e.g., Reference Signal Received Power/Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC IDLE. When the UE 102 has data packets to transmit or receive, its RRC state becomes RRC CONNECTED. The UE 102, when in an RRC IDLE state, can associate itself to different cells.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB. In some embodiments, when the LP eNB 104b is a Home eNB (HeNB), a HeNB Gateway may be provided between the HeNB and the MME/Service Gateway. This HeNB Gateway may control multiple HeNBs and provide user data and signal traffic from the HeNBs towards the MME/Service Gateway. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality and/or connect via an S1 interface to an MME/Service Gateway. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Normal (wideband) communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers.

A resource grid may be used for uplink and downlink transmissions between an eNB 104 and a UE 102. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in the LTE system may be 180 kHz wide in frequency and 1 slot long in time. In frequency, RBs may be either 12×15 kHz subcarriers or 24×7.5 kHz subcarriers wide, dependent on the system bandwidth. The bandwidth of a LTE channel may range from 1.4 MHz to 20 MHz. In Frequency Division Duplexing (FDD) systems, both the uplink and downlink frames may be 10 ms and frequency (full-duplex) or time (half-duplex)

separated. In Time Division Duplexing (TDD) systems, the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols)= 168 resource elements.

There may be several different physical downlink channels that are conveyed using such resource blocks, including the physical downlink control channel (PDCCH) and the physical downlink shared channel (PDSCH). Each downlink subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In addition to the PDCCH and PDSCH, the LTE system may broadcast a Physical Broadcast Channel (PBCH). The PBCH may be used to broadcast a MIB that contains a limited number of parameters to be used for initial access of the cell. The parameters may include as downlink system bandwidth, the Physical Hybrid ARQ Indicator Channel structure, and the most significant eight-bits of the System Frame Number (SFN). The PBCH may occupy 72 subcarriers in the first 4 OFDMA symbols of the second slot of every 10 ms radio frame. The PBCH transmission may be spread over four 10 ms frames (over subframe 0) to span a 40 ms period. When attempting an initial cell search in the LTE system, the UE 102 may engage in channel rastering of 100 kHz steps to determine the center of the Primary Synchronization Signal (PSS).

The Primary Synchronization Signal (PSS) and Secondary Synchronization Signal (SSS) may be used by the UE 102 to identify the cell using the cell ID, the current subframe number, slot boundary, and duplexing mode. The PSS and SSS may be sent in the center 6 PRBs (1.08 MHz) of the system bandwidth used by the eNB 104*a*, 104*b*. The PSS and SSS may be transmitted from the eNB 104*a*, 104*b* in a broadcast to all UEs 102 in symbol periods 6 and 5, respectively, in each of subframes 0 and 5 of each radio frame with a normal CP. The PSS may be used for slot synchronization and carry one of 3 cell IDs in a group sequence; the SSS may be used for frame synchronization and carry one of 170 unique cell identifiers so that 510 unique combinations of cell ID and cell identifier exist in the LTE system. As the frequency location of the PSS may be a constant, the PSS may permit the UE 102 to synchronize to the network without any a priori knowledge of the allocated bandwidth using a correlation at the expected band to obtain the PSS/SSS.

Specifically, the PSS and SSS may be comprised of a sequence of length 62 symbols, mapped to the central 62 subcarriers around the Direct Current (D.C.) subcarrier, the subcarrier whose frequency would be equal to the RF center frequency of the UE 102. The PSS may be constructed from a frequency-domain Zadoff-Chu (ZC) sequence of length 63. The UE 102 may be able to obtain the physical layer cell ID and achieve slot synchronization after the detection of the PSS. The SSS sequences may be generated according to maximum length sequences (M-sequences), which can be created by cycling through every possible state of a shift register of length n. Detection of the PSS and SSS may enable time and frequency synchronization, provide the UE with the physical layer identity of the cell and the CP length, and inform the UE whether the cell uses FDD or TDD. After detection of the PSS and SSS, the UE 102 may be able to communicate with the eNB 104 to receive and decode the PDCCH and any PDSCH intended for the UE 102 and provide uplink transmissions to the eNB 104.

Two Synchronization channels may be defined for cell search. The Primary Synchronization channel (P-SCH) carries a primary code with a value 0-2 that indicates the cell ID within a cell ID group. The sequence to be transmitted on the PSS corresponding to one of the cell IDs is generated from a frequency-domain ZC sequence, which results in 3 root indexes, one each for the 3 cell-IDs. The Secondary Synchronization channel (S-SCH) may carry a secondary code with a value 0-167. This indicates the cell ID group, one from 168 possible groups. The UE 102 may correlate the received signal with the variations and identify the maximum correlation value to determine the value of the codes and obtain the Physical Cell ID of the cell and to be radio frame, subframe and slot aligned with the cell.

The EPC 120 may be in communication with various servers, such as an application server, directly or through the internet. The application server can be configured to support one or more communication services such as Voice-over-Internet Protocol (VoIP) sessions, Push-to-Talk (PTT) sessions, group communication sessions, and various social networking services for UEs that can connect to the application server. The application server can also be configured as a cloud services provider (CSP) for CIoT UEs.

Figure 2:
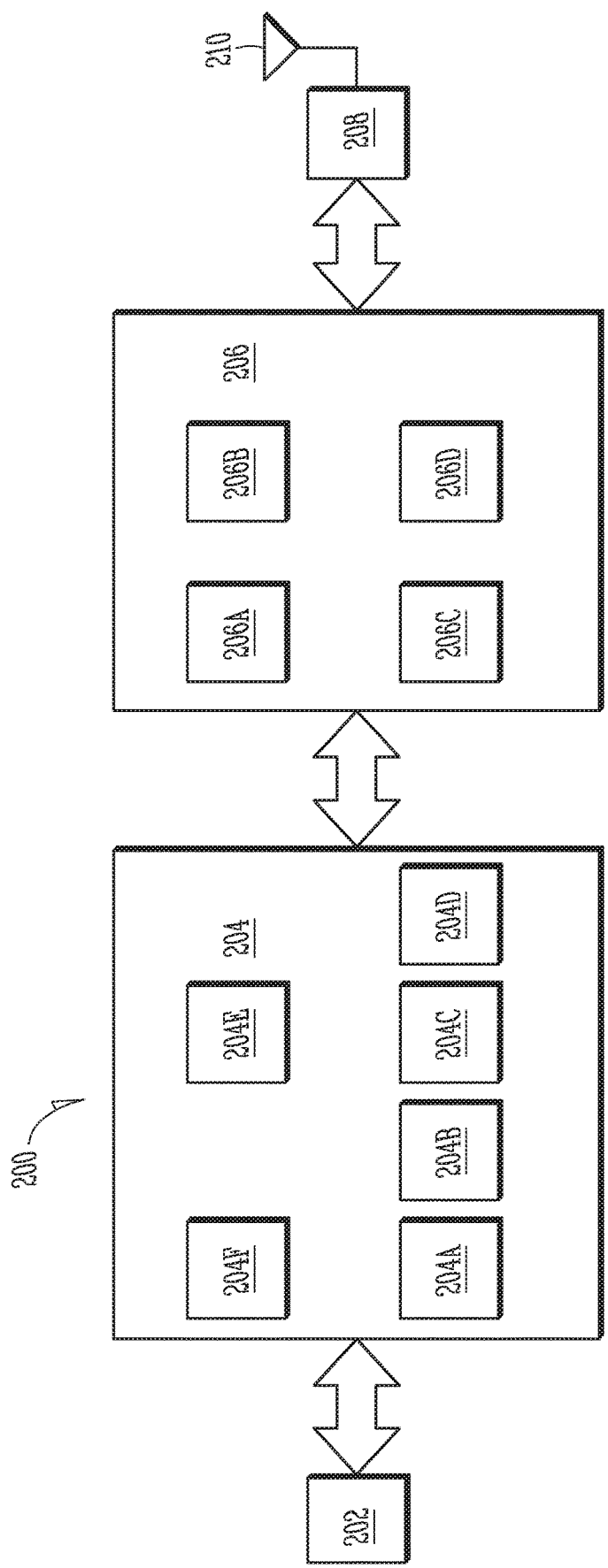
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in the UE 102 (or eNB 104) shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
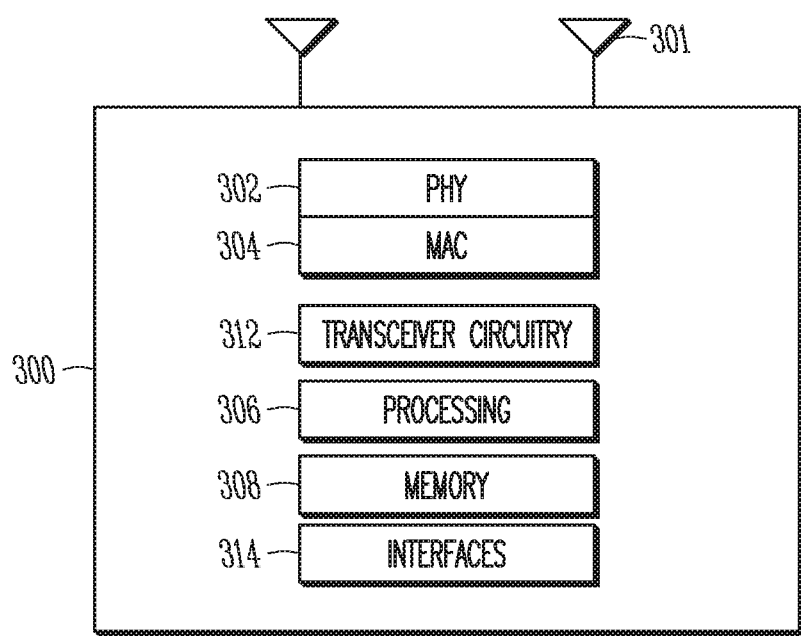
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured to elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
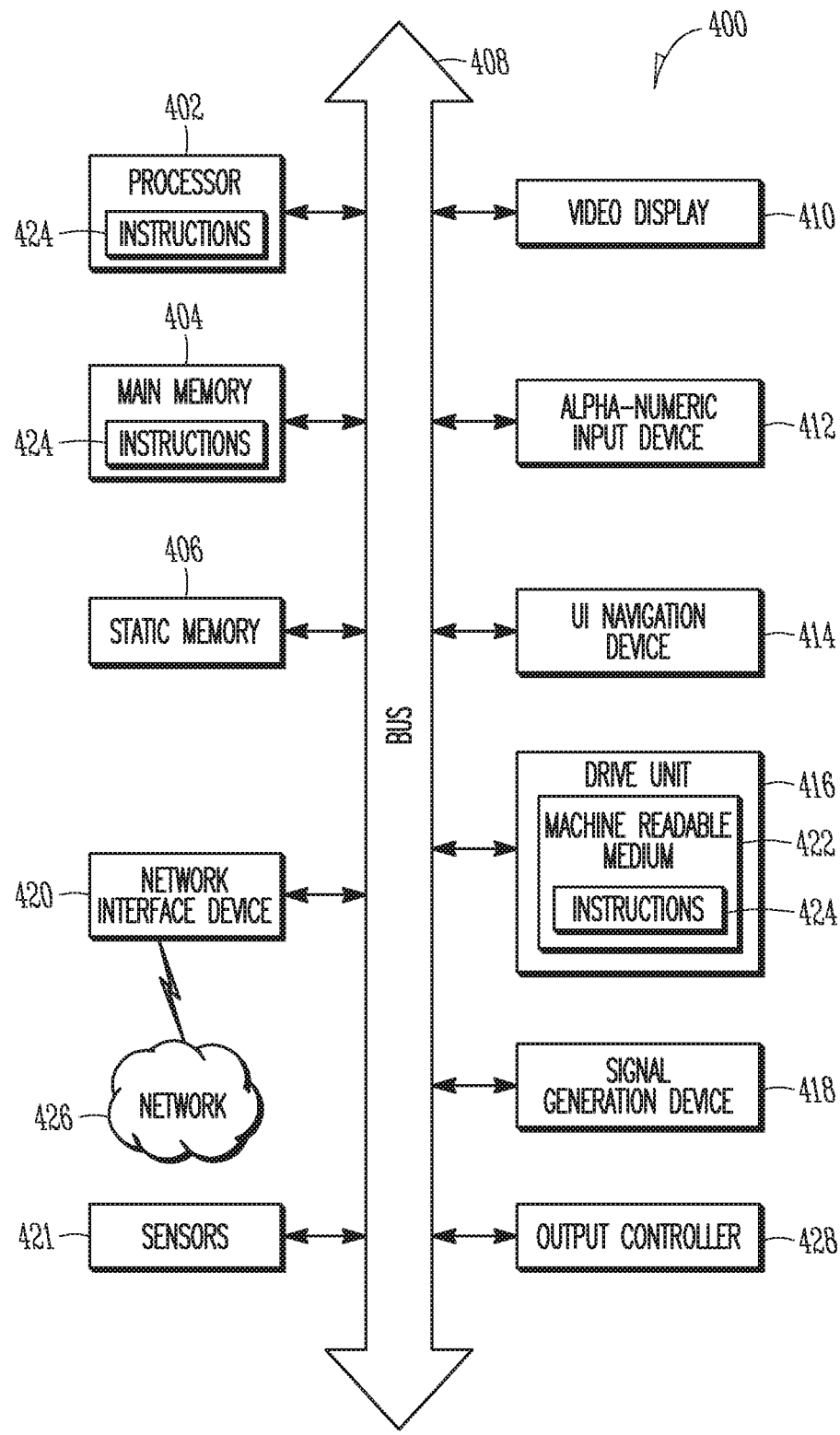
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As described above, the use of narrowband IoT (NB-IoT) communications may be desirable in an increasing number of circumstances. The LTE system may optimize various parameters to enable communication with a massive number of such devices. The NB-IoT UEs may differ from typical UEs and have very low device complexity, be latency-tolerant, and use low throughput and very low power consumption. Designs of systems compatible with NB-IoT UEs can be based on an evolution of the 3GPP LTE-Advanced features like 3GPP Release 13 support of low complexity MTC devices (termed as Rel-13 LC UE or Category M1 devices) that to support a bandwidth of 1.4 MHz on the DL and UL at both RF and baseband irrespective of the system bandwidth. The 3GPP LTE NB-IoT specifications define a Radio Access Technology (RAT) for NB-IoT based on a non-backward-compatible variant of the E-UTRA standard specifically tailored towards improved indoor coverage, support for a massive number of low throughput devices, low delay sensitivity, ultra-low device complexity and cost, low device power consumption and (optimized) network architecture.

Unlike LTE systems, in which communications may use channel bandwidths of 1.4 MHz to 20 MHz (or more), NB-IoT UEs may communicate using bandwidths of 180 kHz. Systems that are compatible with NB-IoT communications thus support only 180 kHz UE bandwidths for both DL and UL with NB-IoT UEs. NB-IoT systems may be deployed in three different modes of operation—stand-alone deployment that can be based on re-farming of existing GSM bands, NB-IoT deployment in the guard band of an LTE carrier, and NB-IoT deployed in-band of an LTE carrier. A NB-IoT carrier generally comprises one legacy LTE PRB for in-band mode and its equivalent in stand-alone/guard-band modes, corresponding to a system bandwidth of 180 kHz.

As NB-IoT UEs may operate in one of the different operation modes, this may cause difficulty in initial access as the different operation modes, while having a unified downlink design with 15 kHz sub-carrier spacing, may involve processing differences as described in more detail below. The NB-IoT operation modes deployed by the eNB may include a standalone mode, a guard-band mode, and an in-band mode. In the standalone mode, the NB-IoT PRB locations are flexible; as this mode uses bands that are unrelated to the LTE spectrum the NB-IoT PRBs may be disposed so as to align the center of the NB-IoT PRB with the LTE 100 kHz channel raster. In the guard-band mode, the NB-IoT PRBs may be disposed in the guard bands disposed at the edges of the LTE network. The guard bands may provide a buffer between unsynchronized LTE TDD systems or between co-located LTE FDD and TDD systems, for example, to ensure minimal interference or leakage between the disparate systems. In the in-band mode, the NB-IoT PRBs may be disposed within the sub-carriers used for wideband communication.

In either the in-band or guard-band mode, co-existence issues in the form of the starting point or sub-carrier offset may arise with use of the existing channel raster. In particular, if the LTE channel raster is used for the in-band or guard-band mode for NB-IoT systems, misalignment may exist between the center of the NB-IoT PRB and the closest channel raster for both odd and even bandwidth configurations of LTE. PSS and PRB centers for NB IoT systems operating in the in-band or guard-band mode may be offset ±2.5 kHz for even bandwidth or ±7.5 kHz for odd bandwidth LTE configurations. This misalignment may lead to sampling frequency offsets, degrading performance for decoding of packet data. It may thus be desirable for the NB-IoT UE to know the offset to figure out the DL carrier frequency.

To address the channel raster compatibility, the operation mode may be indicated to the NB-IoT UE. In some embodiments, the difference between the standalone mode and the in-band/guard-band mode merely may be indicated due to the compatibility differences between the two sets of modes. The operation mode may be indicated during the initial cell search phase or later, when the NB-IoT UE obtains the system information. In the former case, the operation mode may be provided via a narrowband PSS (NPSS) or/and a NSSS, which are different from the LTE PSS and SSS, and may be limited to a maximum of 180 kHz frequency. In particular, the narrowband communications may use a single PRB with a 15 kHz spacing. In the latter case, the operation mode may be provided via the master information block (MIB) carried by the PBCH. Some of the embodiments disclosed may also relate to options for indicating FDD or TDD configuration for the NB-IoT.

When initially powering on, a NB-IoT UE may perform operations to permit the NB-IoT UE to communicate with the network, including performing a NB-IoT cell search. The NB-IoT cell search may contain two phases. In the first phase, the system timing and frequency offset may be detected. The NB-IoT may use information in the NPSS for the first phase. The first phase may enable the NB-IoT UE to determine timing for the symbol and subframe, as well as frequency offset compensation. In the second phase, frame synchronization and physical cell ID detection may be determined. The NB-IoT may obtain information of the second phase from the NSSS.

In addition to the above information, one or more of the NPSS and NSSS (and NMIB in some embodiments) may contain a single bit of additional information. In some embodiments, the NPSS may additionally be able to indicate which of the standalone mode and the in-band/guard-band mode is being used by the eNB as the deployment mode. Alternatively, the NPSS may be able to indicate which of the in-band mode and the standalone/guard-band mode is being used as the deployment mode. In some embodiments, this information may be provided directly while in other embodiments the operation mode information may be able to be discerned indirectly through other information based on conditions that exist due to the use of a particular operation mode. This permits a single bit of information to be used in the NPSS, which may not significantly increase the UE detection complexity. In some embodiments, the use of a single bit of information to convey whether the NB-IoT UE is to adjust the cell search operations may be indicated by exploiting the computational benefits of complex conjugate ZC sequences to limit the number of correlation operations, and thus, UE complexity for performing cell search procedure. In other embodiments, the additional single bit can be used to indicate a FDD or TDD configuration.

Figure 5:
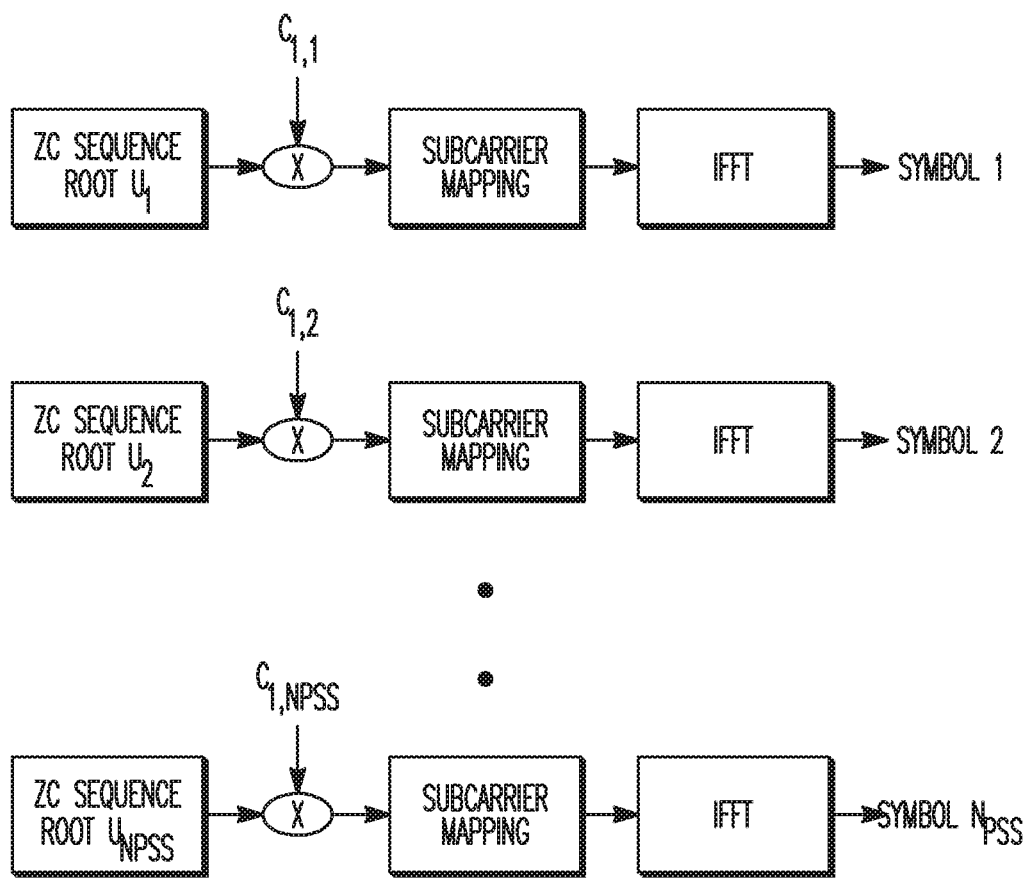
FIG. 5 illustrates narrowband primary synchronization signal generation in the frequency domain in accordance with some embodiments.

FIG. 5 illustrates narrowband primary synchronization signal generation in the frequency domain in accordance with some embodiments. In particular, a NPSS sequence design may be used in which multiple short ZC sequences are concatenated together in the time domain and transmitted from the eNB over multiple symbols. For $N_{PSS}$ symbols in a subframe used for NPSS transmission, the root index corresponding to the i-th symbol (i=1, 2, ..., $N_{PSS}$) may be given by $u_i$. The NPSS sequence may be composed of length $N_{ZC}$ root $u_i$ ZC sequences, where $N_{ZC}$ is chosen to be prime. The NPSSS sequence x(n) may be given by:

$$x(n) = e^{-\frac{j\pi u_i n(n+1)}{N_{ZC}}}, n = 0, 1, \ldots, N_{ZC} - 1$$

Thus, the NPSS sequences corresponding to the $N_{PSS}$ symbols have roots $u_1, u_2, \ldots, u_{N_{PSS}}$, where each symbol has a different root. Each OFDM symbol may thus carry a sequence corresponding to a unique root index. The NPSS sequence may then be multiplied by a cover code $C_1$ using a multiplier. The cover code may be a vector of i elements, each element being $C_{1,i}$. Thus, each $N_{ZC}$ root $u_i$ ZC sequence may be multiplied by a different element. In other words, a cover code $C_1$ of length $N_{PSS}$ is applied to the NPSS over the NPSS OFDM symbols, where each element of the short ZC sequence in an OFDM symbol i is multiplied by the corresponding element $C_{1,i}$ of the cover code. In some embodiments, the cover code for each ZC sequence may be different, while in other embodiments the cover code may be the same for each ZC sequence. After the multiplication, the resulting NPSS sequences may be mapped to different sub-carriers by a sub-carrier mapper. The resulting sub-carriers are then supplied to an inverse fast Fourier transform (IFFT) to convert the signals from the frequency domain to the time domain. The maximum number of symbols (i.e., $N_{PSS}$) may in some embodiments be 11 OFDM symbols as the first 3 symbols may be reserved for PDCCH transmission. In some embodiments, the NB-IoT symbols may be the same and may be repeated to increase the SNR or SINR for correlation purposes.

In addition to the original NPSS sequence being multiplied with the cover code $C_1$, the conjugate of the NPSS sequence may be multiplied with a separate cover code $C_2$. The use of the complex conjugate in addition to the original sequence may permit a single bit to be indicated. The conjugate NPSS sequence may have roots ($N_{ZC}-u_1$, $N_{ZC}-u_2$, ..., $N_{ZC}-u_{N_{PSS}}$) compared with the roots of the original sequence $u_1, u_2, \ldots, u_{N_{PSS}}$. Like the NPSS sequence, $N_{PSS}$ may in some embodiments be 11.

For example, each consecutive OFDM symbol pair may consist of different root indices across different OFDM symbols. A complex conjugate ZC sequence root pair ($u_1$, $N_{ZC}-u_1$) can be used at every two OFDM symbols. The presence of complex conjugate pairs may eliminate timing ambiguity resulting from integer frequency offsets. In some embodiments, the overall structure of NPSS may be ($u_1$, $N_{ZC}-u_1, u_2, N_{ZC}-u_2, u_3, N_{ZC}-u_3, \ldots$). When the number of symbols is odd, the last symbol can be a repetition of the previous symbol. The $N_{PSS}$ symbol NPSS sequence can be repeated every $t_{PSS}$ ms in time. Typical values of $t_{PSS}$ may be integer multiples of 10 ms.

The information provided by use of the conjugate NPSS sequence may be different in different embodiments. For example, in some embodiments the conjugate NPSS sequence multiplied by the cover code $C_2$ may be used to distinguish between the in-band mode vs. guard-band/standalone mode used as the deployment mode by the eNB. This information can be used by the UE to determine whether LTE cell specific reference signals (CRSs) are being transmitted in the NB-IoT PRB. As CRS may puncture the NSSS transmissions in in-band deployment modes for LTE systems, the use of this information may be of importance for UEs in eNBs that use the in-band deployment mode. If the conjugate NPSS sequence indicates that the guard-band or standalone mode is used as the deployment mode, a further indication of which of standalone or guard-band mode can be provided subsequently. The further indication may be indicated explicitly or implicitly, for example in the Narrowband Master Information Block (NMIB) carried by the NPBCH. In addition to the presence of CRS, the cover code may also implicitly indicate whether the NPDCCH/NPDSCH are rate matched, starting with OFDM symbol #0 for standalone or guard-band modes of operation.

Rather than using the information provided by the conjugate NPSS sequence (multiplied by the cover code) to directly distinguish between deployment modes, the bit may be used in an indirect manner to provide this information. In some embodiments, the bit may be used by the eNB to indicate information about raster frequency offset. As above, if the NB-IoT may use a 100 kHz LTE channel raster, there may be a misalignment between the center of the NB-IoT physical resource block (PRB) and the closest channel raster if the NB-IoT PRB is to be aligned with the LTE PRB for guard-band/in-band operation modes. For example, in this case, when using the 100 kHz raster, the minimum value of this misalignment can be 2.5 kHz or 7.5 kHz respectively for an even or odd bandwidth configuration for LTE system bandwidth. In some embodiments, the bit may be used by the eNB to indicate information about raster frequency offset. In particular, the raster frequency offset may be indicated as being 0 kHz or as taking a non-zero value (which may be either ±2.5 kHz or ±7.5 kHz). This may aid the UE to differentiate between standalone (zero offset) and in-band/guard-band (non-zero offset) deployment and allow the UE to use blind detection for in correlating the signals. After an indication of a non-zero raster frequency offset, the eNB may subsequently indicate to the UE whether in-band or guard-band deployment mode is being used. This further indication may be provided via an additional single bit of information, indicated explicitly or implicitly, in the NMIB carried by the NPBCH. Alternatively, a different ordering of roots (or ordering of the original/complex conjugate) may be used for different raster offsets, thus carrying the information regarding raster offset.

In one example, the cover codes can be $C_1$=[1 1 1 1 1 1 1 1 1 1 1], $C_2$=[1 1 -1 -1 1 1 -1 -1 1 1 -1]. As indicated above, this corresponds with $N_{PSS}$ being 11 as there are 11 values in each cover code. The cover codes may be chosen for the cross-correlation between the original sequence and conjugate sequence to be much lower (at least 10 dB) than the peak of the auto-correlation profile. For example, set 1 may denote ZC sequence roots [1, 10, 2, 9, 3, 8, 4, 7, 5, 6, 5]) multiplied with $C_1$, and set 2 may denote ZC sequence roots [10, 1, 9, 2, 8, 3, 7, 4, 6, 5, 6]) multiplied with $C_2$. When the autocorrelation of sequence set 1, autocorrelation of sequence set 2 and cross correlation between the two sets is simulated, the peak for cross correlation is about 10 dB below the peak for auto-correlation. This indicates that the sequence sets represent a good combination.

To form the NSSS sequences, a combination of root indices of ZC sequences and scrambling sequences may be used. The resulting NSSS sequences may be used to indicate Cell IDs and achieve frame synchronization. Specifically, the root index, $m_p$, and scrambling sequence index, $k_p$, may uniquely represent a cell ID p, where:

$$m_p = 1 + \mod(p, N_{ZC})$$

and $$k_p = \left\lfloor \frac{p}{N_{ZC}} \right\rfloor.$$

Note that $m_p$ may take the values from $\{1, \ldots, N_{ZC}\}$, while $k_p$ may take the values $$\left\{ 0, 1, 2, \ldots, \left\lfloor \frac{N-1}{N_{ZC}} \right\rfloor \right\}.$$

In some embodiments, a combination of the NPSS and NSSS can be used for indicating the raster frequency offset information. The NPSS sequence and its conjugate can be used to indicate the presence of a frequency offset (zero or non-zero). Assuming there are R independent non-zero raster frequency offsets to be indicated, the R offsets can be indicated using unique time-domain cyclic shifts. Specifically, the NSSS sequence can be indicated as $$s_{p,r}(n) = a_p(n) e^{-\frac{j2\pi l_r n}{N_{ZC}}},$$

where $a_p(n)$ denotes the NSSS sequence and shift $l_r$ presents a shift corresponding to the $r^{th}$ raster frequency offset ($r=\{0, \ldots, R-1\}$). For example, when R=4, $l_0$=0, $l_1$=33, $l_2$=66, $l_3$=99.

In some embodiments, the R offsets may be indicated using frequency domain shifts of the NSSS sequence. In other embodiments, different time or frequency cyclic shifts can be defined to indicate which of a FDD or TDD configuration is used by the LTE system.

Figure 6A:
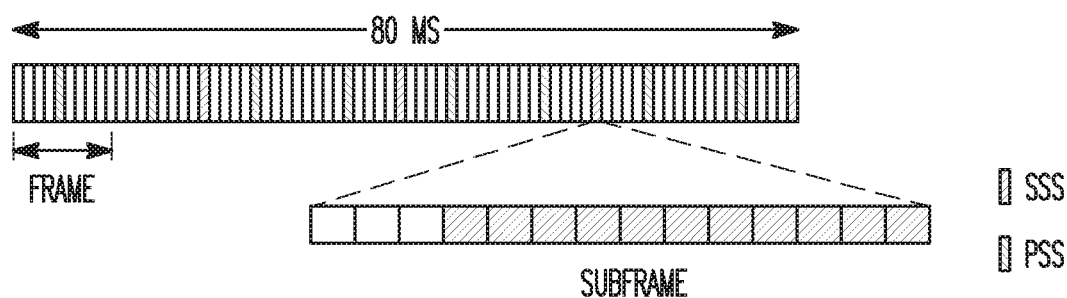
FIGS. 6A and 6B illustrate narrowband synchronization signals in accordance with some embodiments.
Figure 6B:
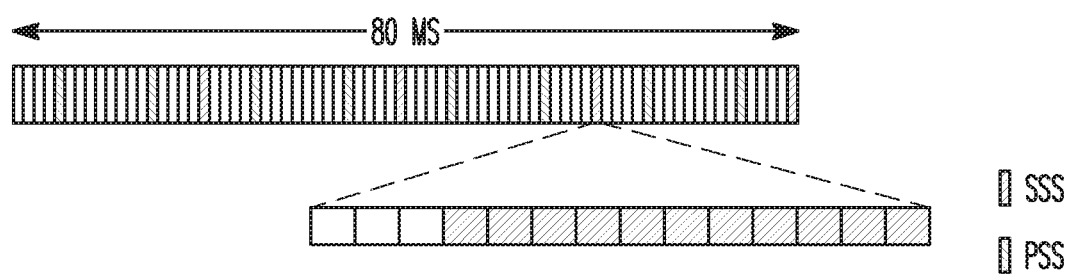

In some embodiments, the relative location of NPSS and NSSS can be used to indicate whether FDD or TDD operation is used by the eNB. FIGS. 6A and 6B illustrate narrowband synchronization signals in accordance with some embodiments. In particular, FIG. 6A illustrates the NPSS and NSSS for an FDD configuration, while FIG. 6B illustrates the NPSS and NSSS for a TDD configuration. An 80 ms period is shown in FIGS. 6A and 6B. In FIG. 6A, the NPSS may be broadcast by the eNB in subframe #4 of every radio frame. The NB-frame may be 80 ms long and the NSSS sequence can be sent over 1 subframe or, as shown, spread over multiple (e.g., 2, 3, 4) subframes in the 80 ms period. The NSSS, on the other hand, may be broadcast by the eNB in subframe #9 of even radio frames only. In FIG. 6B, the NPSS may be broadcast by the eNB in subframe #5 of every radio frame. The TDD NSSS may be broadcast by the eNB in subframe #9 of even radio frames, similar to FDD operation. Alternatively, the FDD NPSS may be broadcast by the eNB in subframe #5 and the TDD NPSS may be broadcast by the eNB on subframe #4. In some embodiments, the location of the NPSS and NSSS can render certain configurations unusable for TDD operation.

can be chosen as the least prime number greater than $N_{SSS}*N_{sc}*S_{SSS}$ and the sequence can be truncated to the desired length.

The sequence $d(n)$ used for the NSSS may be generated from a frequency-domain ZC sequence similar to the above:

$$d(n) = b_q(m)e^{-j2\pi\theta_f n}e^{-\frac{j\pi un'(n'+1)}{131}}$$

where:

$$n = 0, 1, \ldots, 131$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

The binary sequence $b_q(m)$ may be given by Table 10.2.7.2.1-1 in 3GPP TS 36.211. The cyclic shift $\theta_f$ in frame number $n_f$ may be given by $$\theta_f = \frac{33}{132}(n_f/2) \bmod 4.$$

TABLE 10.2.7.2.1-1

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1] |
| 2 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 1] |
| 3 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 −1 1 1 −1 −1 1 1 −1 1 −1 −1 1 −1 1 1 1 −1 1 −1 −1 1 1 −1 −1 1 1 −1 1 −1 −1 1 1 −1 −1 1 −1 1 1 −1 −1 1 1 −1 1 −1 −1 1 −1 1 1 1 −1 −1 1 1 −1 1 −1 −1 1] |

Thus, the NPSS may allow a NB-IoT UE to acquire initial timing and frequency synchronization with the eNB and the NSSS may allow a NB-IoT UE to determine the PCID and identify the 20 ms radio frame boundary. The NSSS may be composed of length $N_{ZC}$ ZC sequences, where $N_{ZC}$ is chosen to be prime. However, unlike NPSSS, which may be formed of short ZC sequences concatenated in time, NSSS may contain long ZC sequences mapped to one or multiple sets of consecutive $N_{SSS}$ OFDM symbols that are spread across one or multiple subframes in a NB-frame. For the length of the ZC sequence $N_{ZC}$: if $N_{ZC}<N_{SSS}*N_{sc}*S_{SSS}$, $N_{ZC}$ can be chosen as the highest prime number less than $N_{SSS}*N_{sc}*S_{SSS}$ and the sequence can be padded with zeros or cyclically extended to a desired length; if $N_{ZC}>N_{SSS}*N_{sc}*S_{SSS}$, $N_{ZC}$ As indicated in 3GPP TS 36.211, the same antenna port may be used for transmission of all symbols of the NSSS within a subframe, with different antenna ports potentially being used to transmit downlink reference signals. Similarly, the NSSS transmitted in different subframes may use different antenna ports.

The sequence $d(n)$ may be mapped to resource elements (k, l) in sequence starting with d(0) in increasing order of first the index k over 12 assigned subcarriers and then the index l over the assigned last NSSS symbols of subframe 9 in radio frames fulfilling $n_f \bmod 2=0$, where the NSSS symbols is given by Table 10.2.7.2.2-1 in 3GPP TS 36.211.

TABLE 10.2.7.2.2-1

| Cyclic prefix length | $N_{symb}^{NSSS}$ |
|---|---|
| Normal | 11 |

For resource elements (k, l) overlapping with resource elements where CRS are transmitted, the corresponding sequence element d(n) may not be used for the NSSS but may be counted in the mapping process.

Thus, as shown in FIGS. 6A and 6B, the NSSS may be transmitted in the last subframe of every other (even) radio frame. Thus, the NSS may use 11 OFDM symbols and 12 subcarriers in the subframe. To synchronize to the network, in addition to obtaining cyclic shift (CS) information used to generate the ZC sequences, the NB-IoT UE may obtain the 80 ms and 20 ms frame boundary by determining the frame index ($n_f$) and the OFDM symbol (symbol index p) as 4 NPSS transmissions may occur within the 80 ms frame boundary. However, asynchronous network deployments or synchronized deployments that have significant differences in time of arrivals of the signals at the NB-IoT UE from the neighboring cells (e.g., due to propagation delay) may result in NSSS detection issues. Under certain circumstances, as explained below, the NB-IoT UE may experience ambiguity in the detection of the correct 20 ms timing boundary and cell ID due to a strong correlation from a neighboring cell, leading to a wrong cell and frame timing detection and to increased UE power consumption.

In particular, as one solution to avoid the NSSS false detection, the order of the mapping of the CSs may be adjusted in the different 20 ms boundaries to (0, 99, 33, 66) to reduce the false detection problem described above. However, to realize the benefit of this design, the NB-IoT UE consider at least four consecutive NSSS transmission instances and rely on correct detection of the (0, 99) CS pair. This may not benefit a single-observation-based detection of the NSSS design that includes the key sequence construction components described above, i.e., where the PCID is indicated by a combination of ZC root sequence choice and one of four Hadamard sequences, while the 20 ms frame boundary is indicated by four different time-domain CSs.

To decrease instances of false detection, a decrease in cross-correlation may be desirable. Unfortunately, considering non-zero timing differences between the signals arriving at the UE from different cells due to asynchronous deployments or propagation delay effects, some combination of the NSSS sequences out of the entire space of 126 (root sequences)*4 (Hadamard sequence-based binary scrambling codes)*4 (time-domain CS)=2016 NSSS sequences can lead to high cross-correlation. Such cases of high cross-correlation implies that, for particular values of the time difference of arrival of the NPSS and NSSS at the NB-IoT UE, the NB-IoT UE may falsely identify a wrong System Frame Number (SFN) time and PCID.

More specifically, the primary reason for this lack of robustness to different timing offsets between cells is that time-domain CS is used to distinguish the different 20 ms timing boundaries. Thus, in frequency domain, the entire sequence is subjected to a single value of phase rotation. That is, for every OFDM symbol, the effect of the CS (i.e., the resulting phase rotation in frequency domain) is the same. The UE starts the cell search procedure with the initial timing detection based on the NPSS transmissions, and then checks the correlation for all possible NSSS sequences with the received NSSS sequences corresponding to each timing hypothesis based on the number of detected NPSS detection peaks.

In the presence of two signals (from different cells) that arrive at the NB-IoT UE with specific timing difference values Δt (e.g., Δt=±n(16 μs) where n is an integer), the UE may incorrectly identify the wrong 20 ms boundary (and possibly also the PCID) due to the high cross-correlation properties. For instance, in one example, for i≠j, the NB-IoT UE may falsely detect the combination of PCID_j and CS_j (or PCID_i and CS_k) for the timing hypothesis from NPSS_i detection due to the Δt timing difference, instead of detecting PCID_i and CS_i for the timing hypothesis based on detection of NPSS_i and PCID_j and CS_j for the timing hypothesis based on detection of NPSS_j.

Figure 7:
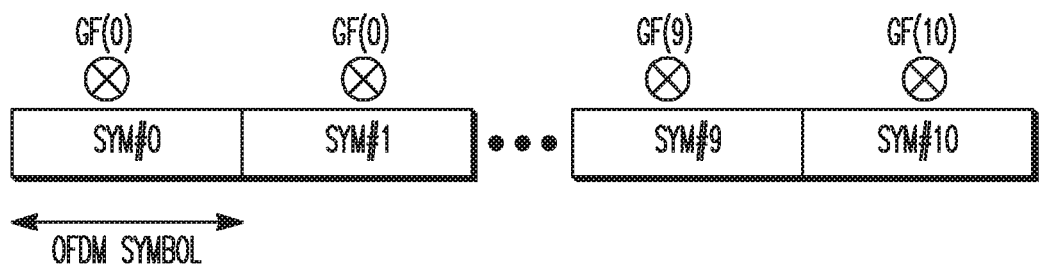
FIG. 7 illustrates symbol modulation in accordance with some embodiments.

To minimize the instances of false detection and overcome this lack of robustness in multi-cell environment, the NSSS may be designed to improve the cross-correlation properties of the NSSS sequences. FIG. 7 illustrates symbol modulation in accordance with some embodiments. As shown, the NSSS sequence construction may include a different modulation applied to the sequence elements mapped to different OFDM symbols used to carry the NSSS. The sequence that is applied to the different NSSS symbols in an NSSS subframe may bear a one-to-one mapping to the 20 ms boundary that is indicated using different time-domain CSs.

In this case, the frame timing information (in the present case, the 20 ms frame boundary information) may be indicated using a combination of time-domain cyclic shifts and a binary sequence that is used to modulate the NSSS sequence elements mapped to particular OFDM symbols. Such a design may reduce the probability of false detection in the presence of non-zero timing offsets between signals received from different cells. The sequence may be, for example, a length-11 binary sequence that is based on binary Golay sequences.

The sequence d(n) used for the NSSS may be generated from a frequency-domain ZC sequence:

$$d(n) = b_q(m) e^{-j2\pi\theta_f n} e^{-\frac{j\pi u n'(n'+1)}{131}} g_f(p)$$

where:

$$n = 0, 1, \ldots, 131$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

$$p = \left\lfloor \frac{n}{12} \right\rfloor$$

$$f = (n_f/2) \bmod 4$$

The binary sequence $b_q(m)$ may be given by Table 10.2.7.2.1-1 of TS 36.211. The cyclic shift $\theta_f$ in frame number $n_f$ is given by $$\theta_f = \frac{33}{132}(n_f/2) \bmod 4.$$

One example of the binary sequence $g_f$ as a function of $f$ is given by Table 1 below.

TABLE 1

| f | $g_f(0), \ldots, g_f(10)$ | | | | | | | | | | |
|---|---|---|---|---|---|---|---|---|---|---|---|
| 0 | [1 | 1 | 1 | −1 | 1 | 1 | −1 | 1 | 1 | 1 | 1] |
| 1 | [1 | −1 | 1 | 1 | 1 | −1 | −1 | −1 | 1 | −1 | 1] |
| 2 | [1 | 1 | −1 | 1 | 1 | 1 | 1 | −1 | 1 | 1 | −1] |
| 3 | [1 | −1 | −1 | −1 | 1 | −1 | 1 | 1 | 1 | −1 | −1] |

The binary sequence $g_f$ may be 11 bits in length, one for each of the 11 OFDM symbols used for the NSSS. The length-11 binary sequence above may be generated from truncation of length-16 binary Golay sequences. Each NSSS element (indexed by 'n') that corresponds to a particular OFDM-symbol 'p' may be modulated by the corresponding p-th element of the binary sequence $g_f$. The choice of the binary sequence for OFDM symbol-level modulation based on binary Golay code may ensure preservation of acceptable auto-correlation properties of the resulting NSSS sequence for robust detectability.

Figure 8:
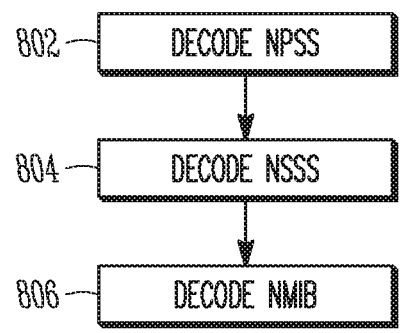
FIG. 8 illustrates flowchart of narrowband control signal modification in accordance with some embodiments.

FIG. 8 illustrates flowchart of narrowband control signal modification in accordance with some embodiments. The method may be performed by any of the UEs indicated in FIGS. 1-4. The various operations may be performed in any order. At operation 802, the UE may receive and decode the NPSS. The NPSS may be modulated by the eNB using conjugate sequences multiplied by a cover code to indicate a single bit of information. This information may indicate whether an FDD or TDD configuration is being transmitted by the eNB. Alternatively, the information may indicate which of 2 different sets of operation modes has been deployed by the eNB. At least one of the sets may have, for example, a plurality of operating modes. In another embodiment, the information may indicate whether a zero or non-zero raster frequency offset is to be used by the NB-IoT UE. After modulation, the NPSS is broadcast by the eNB to be received by any NB-IoT UE in the cell.

At operation 804, the NSSS may be received and decoded by the NB-IoT UE after being modulated and broadcast by the eNB. The NSSS may indicate the PCID of the eNB by a combination of ZC base sequence and a binary scrambling code. The remaining information pertaining to mode of operation or specific raster frequency may be indicated using time or frequency domain cyclic shifts of the NSSS sequence. In addition, the NSSS may be modulated by a length 11 OFDM symbol-level modulation to indicate the frame timing information, along with the time domain cyclic shifts of the ZC base sequence.

At operation 806, the NMIB may be received and decoded by the NB-IoT UE after being modulated and broadcast by the eNB. In addition to indicating parameters such as downlink system bandwidth, and the four most significant e-bits of the NB-IoT System Frame Number (SFN), etc., the NMIB may indicate which of the plurality of operating modes is deployed by the eNB in the set indicated by the NPSS. As the NPSS and NSSS (and NPBCH) may be periodic transmissions from the eNB, no causality may exist between these signals/channels.

EXAMPLES

Example 1 is an apparatus of a narrowband user equipment (UE), the apparatus comprising: a memory; and processing circuitry in communication with the memory and arranged to: decode narrowband synchronization and control signals from an evolved NodeB (eNB), the narrowband control signals modulated for communication with the narrowband UE through use of at least one modulation, the narrowband synchronization and control signals received within the bandwidth spanned by a single physical resource block and comprising a narrowband Primary Synchronization Signal (NPSS), a narrowband Secondary Synchronization Signal (NSSS) and a narrowband Master Information Block (NMIB) on a narrowband physical broadcast channel (NPBCH); determine, from the at least one modulation frame, configuration information of the eNB; and establish initial communication with the eNB based on the configuration information determined from the at least one modulation.

In Example 2, the subject matter of Example 1 optionally includes that the at least one modulation comprises a NPSS modulation that indicates a single bit of frame configuration information, the NPSS modulation comprising use of conjugate Zadoff Chu (ZC) sequences multiplied by a cover code for each orthogonal frequency division multiplexed (OFDM) symbol in a narrowband subframe.

In Example 3, the subject matter of Example 2 optionally includes that the processing circuitry is configured to: determine between which of Frequency Division Duplexing (FDD) and Time Division Duplexing (TDD) is used by the eNB as indicated by the single bit of frame configuration information.

In Example 4, the subject matter of any one or more of Examples 2-3 optionally include that the processing circuitry is configured to: differentiate between which of different sets of operating modes is deployed by the eNB through determination of the single bit of frame configuration information, the sets of operating modes comprising a first set comprising an in-band operation mode and a second set comprising a standalone operation mode and a guard-band operation mode.

In Example 5, the subject matter of Example 4 optionally includes that the processing circuitry is configured to: when the single bit of frame configuration information indicates the second set of operation modes, determine from the NMIB which of the standalone and guard-band operation mode is deployed by the eNB.

In Example 6, the subject matter of any one or more of Examples 2-5 optionally include that the processing circuitry is configured to: differentiate between a zero and non-zero kHz raster frequency offset through determination of the single bit of frame configuration information, and determine, through the raster frequency offset, which of different sets of operating modes is deployed by the eNB, the sets of operating modes comprising a first set comprising a standalone operation mode and a second set comprising an in-band operation mode and a guard-band operation mode.

In Example 7, the subject matter of Example 6 optionally includes that the processing circuitry is configured to: when the single bit of frame configuration information indicates the non-zero kHz raster frequency offset, determine from the NMIB which of the in-band and guard-band operation mode is deployed by the eNB.

In Example 8, the subject matter of Example 7 optionally includes that the NMIB indicates that the raster frequency offset has a value selected from among ±2.5 kHz and ±7.5 kHz.

In Example 9, the subject matter of any one or more of Examples 7-8 optionally include that the processing circuitry comprises baseband circuitry configured to: determine the raster frequency offset from a time-domain or frequency-domain cyclic shift of the NSSS.

In Example 10, the subject matter of any one or more of Examples 2-9 optionally include that the processing circuitry is configured to: perform correlations on the ZC sequences multiplied by the cover codes, the cover codes for the ZC sequences selected such that a cross-correlation between an NPSS based on an original set of ZC sequences and an NPSS based on a set of conjugate ZC sequences is at least 10 dB lower than a peak of an auto-correlation profile for either NPSS.

In Example 11, the subject matter of any one or more of Examples 1-10 optionally include that the processing circuitry is configured to: determine which of Frequency Division Duplexing (FDD) and Time Division Duplexing (TDD) is used by the eNB through one of a time or frequency cyclic shift of the NSSS.

In Example 12, the subject matter of any one or more of Examples 1-11 optionally include that the processing circuitry is configured to: determine which of Frequency Division Duplexing (FDD) and Time Division Duplexing (TDD) is used by the eNB through relative locations of the NPSS and NSSS.

In Example 13, the subject matter of any one or more of Examples 1-12 optionally include that the NSSS comprises a Zadoff Chu (ZC) sequence mapped to multiple orthogonal frequency division multiplexed (OFDM) symbols to form NSSS sequence elements for the OFDM symbols, and the at least one modulation comprises an OFDM symbol-level modulation of the NSSS sequence elements.

In Example 14, the subject matter of Example 13 optionally includes that the frame configuration information comprises frame timing information, the frame timing information encoded in time domain cyclic shifts of the ZC sequence and the OFDM symbol-level modulation.

In Example 15, the subject matter of Example 14 optionally includes that the OFDM symbol-level modulation is a length-11 binary sequence based on length-16 binary Golay sequences.

In Example 16, the subject matter of any one or more of Examples 14-15 optionally include that the OFDM symbol-level modulation bears a one-to-one mapping to a 20 ms timing boundary indicated using different time-domain cyclic shifts of the ZC sequence.

In Example 17, the subject matter of any one or more of Examples 1-16 optionally include, further comprising: an antenna configured to provide communications between the UE and the eNB.

Example 18 is an apparatus of an evolved NodeB (eNB) comprising: a transceiver; and processing circuitry in communication with the transceiver and arranged to: generate a narrowband Primary Synchronization Signal (NPSS) and a narrowband Secondary Synchronization Signal (NSSS), at least one of the NPSS or NSSS modulated using a modulation that indicates one of a duplexing scheme, a raster frequency offset, an operating mode or frame timing used by the eNB; and cause the transceiver to transmit the NPSS and NSSS to a narrowband user equipment (UE) on a narrowband channel of one physical resource block (PRB).

In Example 19, the subject matter of Example 18 optionally includes that the modulation comprises a NPSS modulation that indicates a single bit, the NPSS modulation comprising use of conjugate Zadoff Chu (ZC) sequences multiplied by a cover code for each orthogonal frequency division multiplexed (OFDM) symbol in a narrowband subframe, and the single bit indicates one of: which of Frequency Division Duplexing (FDD) and Time Division Duplexing (TDD), which operation mode of: an in-band operation mode, or a standalone or guard-band operation mode, or whether a zero or non-zero raster frequency offset, is used by the eNB.

In Example 20, the subject matter of Example 19 optionally includes that the processing circuitry is configured to: cause the transceiver to transmit a narrowband Master Information Block (NMIB), and when the single bit indicates that the operation mode is the standalone or guard-band operation mode, indicate in the NMIB which of the standalone and guard-band operation mode is deployed, and when the single bit indicates the non-zero raster frequency offset is used, indicate in the NMIB which of the in-band or guard-band operation mode is deployed, the standalone operation mode being indicated when the single bit indicates the zero raster frequency offset is used.

In Example 21, the subject matter of any one or more of Examples 18-20 optionally include that the processing circuitry is configured to: encode in a time-domain or frequency-domain cyclic shift of the NSSS one of: the raster frequency offset, or which of Frequency Division Duplexing (FDD) or Time Division Duplexing (TDD) is used.

In Example 22, the subject matter of any one or more of Examples 18-21 optionally include that the processing circuitry is configured to: encode which of Frequency Division Duplexing (FDD) and Time Division Duplexing (TDD) is used through relative locations of the NPSS and NSSS.

In Example 23, the subject matter of any one or more of Examples 18-22 optionally include that the NSSS comprises a Zadoff Chu (ZC) sequence mapped to multiple orthogonal frequency division multiplexed (OFDM) symbols to form NSSS sequence elements for the OFDM symbols, and the modulation comprises an OFDM symbol-level modulation of the NSSS sequence elements in which frame timing information is encoded through use of time domain cyclic shifts of the ZC sequence and the OFDM symbol-level modulation.

In Example 24, the subject matter of Example 23 optionally includes that the OFDM symbol-level modulation is a length-11 binary sequence based on length-16 binary Golay sequences, and the OFDM symbol-level modulation bears a one-to-one mapping to a 20 ms timing boundary indicated using different time-domain cyclic shifts of the ZC sequence.

Example 25 is a computer-readable storage medium that stores instructions for execution by one or more processors of a user equipment (UE), the one or more processors to configure the UE to: receive from an evolved NodeB (eNB) a narrowband Primary Synchronization Signal (NPSS) and a narrowband Secondary Synchronization Signal (NSSS), at least one of: the NPSS being modulated using a first modulation that indicates via a first single bit one of a duplexing scheme, a raster frequency offset, or an operating mode used by the eNB, or the NSSS being modulated using a second modulation that indicates via a second single bit frame timing used by the eNB; determine eNB information of the NPSS and NSSS, including information indicated by at least one of the first or second bit; and initiate communications with the eNB based on the information of the NPSS and the NSSS.

In Example 26, the subject matter of Example 25 optionally includes that the NPSS modulation comprises use of conjugate Zadoff Chu (ZC) sequences multiplied by a cover code for each orthogonal frequency division multiplexed (OFDM) symbol in a narrowband subframe, and the first single bit indicates one of: which of Frequency Division Duplexing (FDD) and Time Division Duplexing (TDD), which operation mode of: an in-band operation mode, or a standalone or guard-band operation mode, or whether a zero or non-zero raster frequency offset, is used by the eNB.

In Example 27, the subject matter of Example 26 optionally includes that the instructions further configure the UE to: receive a narrowband Master Information Block (NMIB), and when the first single bit indicates that the operation mode is the standalone or guard-band operation mode, indicate in the NMIB which of the standalone and guard-band operation mode is deployed by the eNB, and when the first single bit indicates the non-zero raster frequency offset is used, indicate in the NMIB which of the in-band or guard-band operation mode is deployed, the standalone operation mode being indicated when the single bit indicates the zero raster frequency offset is used by the eNB.

In Example 28, the subject matter of any one or more of Examples 25-27 optionally include that the processing circuitry is configured to at least one of: determine from a time-domain or frequency-domain cyclic shift of the NSSS one of: the raster frequency offset, or which of Frequency Division Duplexing (FDD) or Time Division Duplexing (TDD) is used by the eNB, or determine from relative locations of the NPSS and NSSS which of Frequency Division Duplexing (FDD) and Time Division Duplexing (TDD) is used by the eNB.

In Example 29, the subject matter of any one or more of Examples 25-28 optionally include that the NSSS comprises a Zadoff Chu (ZC) sequence mapped to multiple orthogonal frequency division multiplexed (OFDM) symbols to form NSSS sequence elements for the OFDM symbols, the modulation comprises an OFDM symbol-level modulation of the NSSS sequence elements in which frame timing information is encoded through use of time domain cyclic shifts of the ZC sequence and the OFDM symbol-level modulation, and the OFDM symbol-level modulation bears a one-to-one mapping to a 20 ms timing boundary indicated using different time-domain cyclic shifts of the ZC sequence.

Example 30 is an apparatus of a user equipment (UE), the apparatus comprising: means for receiving from an evolved NodeB (eNB) a narrowband Primary Synchronization Signal (NPSS) and a narrowband Secondary Synchronization Signal (NSSS), at least one of: the NPSS being modulated using a first modulation that indicates via a first single bit one of a duplexing scheme, a raster frequency offset, or an operating mode used by the eNB, or the NSSS being modulated using a second modulation that indicates via a second single bit frame timing used by the eNB; means for determining eNB information of the NPSS and NSSS, including information indicated by at least one of the first or second bit; and means for initiating communications with the eNB based on the information of the NPSS and the NSSS.

In Example 31, the subject matter of Example 30 optionally includes that the NPSS modulation comprises use of conjugate Zadoff Chu (ZC) sequences multiplied by a cover code for each orthogonal frequency division multiplexed (OFDM) symbol in a narrowband subframe, and the first single bit indicates one of: which of Frequency Division Duplexing (FDD) and Time Division Duplexing (TDD), which operation mode of: an in-band operation mode, or a standalone or guard-band operation mode, or whether a zero or non-zero raster frequency offset, is used by the eNB.

In Example 32, the subject matter of Example 31 optionally includes, further comprising: means for receiving a narrowband Master Information Block (NMIB), and when the first single bit indicates that the operation mode is the standalone or guard-band operation mode, means for indicating in the NMIB which of the standalone and guard-band operation mode is deployed by the eNB, and when the first single bit indicates the non-zero raster frequency offset is used, means for indicating in the NMIB which of the in-band or guard-band operation mode is deployed, the standalone operation mode being indicated when the single bit indicates the zero raster frequency offset is used by the eNB.

In Example 33, the subject matter of any one or more of Examples 30-32 optionally include, further comprising at least one of: means for determining from a time-domain or frequency-domain cyclic shift of the NSSS one of: the raster frequency offset, or which of Frequency Division Duplexing (FDD) or Time Division Duplexing (TDD) is used by the eNB, or means for determining from relative locations of the NPSS and NSSS which of Frequency Division Duplexing (FDD) and Time Division Duplexing (TDD) is used by the eNB.

In Example 34, the subject matter of any one or more of Examples 30-33 optionally include that the NSSS comprises a Zadoff Chu (ZC) sequence mapped to multiple orthogonal frequency division multiplexed (OFDM) symbols to form NSSS sequence elements for the OFDM symbols, the modulation comprises an OFDM symbol-level modulation of the NSSS sequence elements in which frame timing information is encoded through use of time domain cyclic shifts of the ZC sequence and the OFDM symbol-level modulation, and the OFDM symbol-level modulation bears a one-to-one mapping to a 20 ms timing boundary indicated using different time-domain cyclic shifts of the ZC sequence.

Example 35 is a method of initiating narrowband communications of a user equipment (UE), the method comprising: receiving from an evolved NodeB (eNB) a narrowband Primary Synchronization Signal (NPSS) and a narrowband Secondary Synchronization Signal (NSSS), at least one of: the NPSS being modulated using a first modulation that indicates via a first single bit one of a duplexing scheme, a raster frequency offset, or an operating mode used by the eNB, or the NSSS being modulated using a second modulation that indicates via a second single bit frame timing used by the eNB; determining eNB information of the NPSS and NSSS, including information indicated by at least one of the first or second bit; and initiating communications with the eNB based on the information of the NPSS and the NSSS.

In Example 36, the subject matter of Example 35 optionally includes that the NPSS modulation comprises use of conjugate Zadoff Chu (ZC) sequences multiplied by a cover code for each orthogonal frequency division multiplexed (OFDM) symbol in a narrowband subframe, and the first single bit indicates one of: which of Frequency Division Duplexing (FDD) and Time Division Duplexing (TDD), which operation mode of: an in-band operation mode, or a standalone or guard-band operation mode, or whether a zero or non-zero raster frequency offset, is used by the eNB.

In Example 37, the subject matter of Example 36 optionally includes, further comprising: receiving a narrowband Master Information Block (NMIB), and when the first single bit indicates that the operation mode is the standalone or guard-band operation mode, indicating in the NMIB which of the standalone and guard-band operation mode is deployed by the eNB, and when the first single bit indicates the non-zero raster frequency offset is used, indicating in the NMIB which of the in-band or guard-band operation mode is deployed, the standalone operation mode being indicated when the single bit indicates the zero raster frequency offset is used by the eNB.

In Example 38, the subject matter of any one or more of Examples 35-37 optionally include, further comprising at least one of: determining from a time-domain or frequency-domain cyclic shift of the NSSS one of: the raster frequency offset, or which of Frequency Division Duplexing (FDD) or Time Division Duplexing (TDD) is used by the eNB, or determining from relative locations of the NPSS and NSSS which of Frequency Division Duplexing (FDD) and Time Division Duplexing (TDD) is used by the eNB.

In Example 39, the subject matter of any one or more of Examples 35-38 optionally include that the NSSS comprises a Zadoff Chu (ZC) sequence mapped to multiple orthogonal frequency division multiplexed (OFDM) symbols to form NSSS sequence elements for the OFDM symbols, the modulation comprises an OFDM symbol-level modulation of the NSSS sequence elements in which frame timing information is encoded through use of time domain cyclic shifts of the ZC sequence and the OFDM symbol-level modulation, and the OFDM symbol-level modulation bears a one-to-one mapping to a 20 ms timing boundary indicated using different time-domain cyclic shifts of the ZC sequence.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a narrowband user equipment (UE), the apparatus comprising:
   a memory; and
   processing circuitry in communication with the memory and arranged to:
      decode narrowband synchronization and control signals from an evolved NodeB (eNB), the narrowband control signals modulated for communication with the narrowband UE through use of at least one modulation, the narrowband synchronization and control signals received within a bandwidth spanned by a single physical resource block and comprising a narrowband Primary Synchronization Signal (NPSS), a narrowband Secondary Synchronization Signal (NSSS) and a narrowband Master Information Block (NMIB) on a narrowband physical broadcast channel (NPBCH), the at least one modulation comprising a NPSS modulation that indicates a single bit of frame configuration information, the NPSS modulation comprising use of conjugate Zadoff Chu (ZC) sequences multiplied by a cover code for each orthogonal frequency division multiplexed (OFDM) symbol in a narrowband subframe;
      determine, from the at least one modulation, configuration information of the eNB;
      differentiate a raster frequency offset between a zero and non-zero kHz raster frequency offset through determination of the single bit of frame configuration information, and
      determine, through the raster frequency offset, which of different sets of operating modes is deployed by the eNB, the sets of operating modes comprising a first set comprising a standalone operation mode and a second set comprising an in-band operation mode and a guard-band operation mode; and
      establish initial communication with the eNB based on the configuration information determined from the at least one modulation.

2. The apparatus of claim 1, wherein:
   the NSSS comprises a ZC sequence mapped to multiple OFDM symbols to form NSSS sequence elements for the OFDM symbols, and
   the at least one modulation comprises an OFDM symbol-level modulation of the NSSS sequence elements.

3. The apparatus of claim 2, wherein:
the frame configuration information comprises frame timing information, the frame timing information encoded in time domain cyclic shifts of the ZC sequence and the OFDM symbol-level modulation.

4. The apparatus of claim 3, wherein:
the OFDM symbol-level modulation is a length-11 binary sequence based on length-16 binary Golay sequences.

5. The apparatus of claim 3, wherein:
the OFDM symbol-level modulation bears a one-to-one mapping to a 20 ms timing boundary indicated using different time-domain cyclic shifts of the ZC sequence.

6. The apparatus of claim 1, wherein the processing circuitry is configured to:
in response to the single bit of frame configuration information indicating the non-zero kHz raster frequency offset, determine from the NMIB which of the in-band and guard-band operation mode is deployed by the eNB.

7. The apparatus of claim 6, wherein:
the NMIB indicates that the raster frequency offset has a value selected from among ±2.5 kHz and ±7.5 kHz.

8. The apparatus of claim 6, wherein the processing circuitry comprises baseband circuitry configured to:
determine the raster frequency offset from a time-domain or frequency-domain cyclic shift of the NSSS.

9. The apparatus of claim 1, wherein the processing circuitry is configured to:
differentiate between which of other sets of operating modes is deployed by the eNB through determination of the single bit of frame configuration information, the other sets of operating modes comprising a third set comprising the in-band operation mode and a fourth set comprising the standalone operation mode and the guard-band operation mode.

10. The apparatus of claim 9, wherein the processing circuitry is configured to:
when the single bit of frame configuration information indicates the fourth set of operation modes, determine from the NMIB which of the standalone and guard-band operation mode is deployed by the eNB.

11. The apparatus of claim 1, wherein the processing circuitry is configured to:
determine between which of Frequency Division Duplexing (FDD) and Time Division Duplexing (TDD) is used by the eNB as indicated by the single bit of frame configuration information.

12. The apparatus of claim 1, wherein the processing circuitry is configured to:
perform correlations on the conjugate ZC sequences multiplied by the cover codes, the cover codes selected such that a cross-correlation between an NPSS based on an original set of ZC sequences and an NPSS based on a set of the conjugate ZC sequences is at least 10 dB lower than a peak of an auto-correlation profile for either NPSS.

13. The apparatus of claim 1, wherein the processing circuitry is configured to:
determine which of Frequency Division Duplexing (FDD) and Time Division Duplexing (TDD) is used by the eNB through one of a time or frequency cyclic shift of the NSSS.

14. The apparatus of claim 1, wherein the processing circuitry is configured to:
determine which of Frequency Division Duplexing (FDD) and Time Division Duplexing (TDD) is used by the eNB through relative locations of the NPSS and NSSS.

15. The apparatus of claim 1, further comprising:
an antenna configured to provide communications between the UE and the eNB.

16. An apparatus of an evolved NodeB (eNB) comprising:
processing circuitry arranged to:
generate a narrowband Primary Synchronization Signal (NPSS) and a narrowband Secondary Synchronization Signal (NSSS), at least one of the NPSS or NSSS modulated using a modulation that indicates one of a duplexing scheme, a raster frequency offset, an operating mode or frame timing used by the eNB; and
encode the NPSS and NSSS for transmission to a narrowband user equipment (UE) on a narrowband channel of one physical resource block (PRB), the NSSS comprising a Zadoff Chu (ZC) sequence mapped to multiple orthogonal frequency division multiplexed (OFDM) symbols to form NSSS sequence elements for the OFDM symbols, and the modulation comprising an OFDM symbol-level modulation of the NSSS sequence elements in which frame timing information is encoded through use of time domain cyclic shifts of the ZC sequence and the OFDM symbol-level modulation, the OFDM symbol-level modulation is a length-11 binary sequence based on length-16 binary Golay sequences, and the OFDM symbol-level modulation bears a one-to-one mapping to a 20 ms timing boundary indicated using different time-domain cyclic shifts of the ZC sequence; and
a memory configured to store the modulation.

17. The apparatus of claim 16, wherein:
the modulation comprises a NPSS modulation that indicates a single bit, the NPSS modulation comprising use of conjugate ZC sequences multiplied by a cover code for each OFDM symbol in a narrowband subframe, and
the single bit indicates one of:
which of Frequency Division Duplexing (FDD) and Time Division Duplexing (TDD),
which operation mode of:
an in-band operation mode, or
a standalone or guard-band operation mode, or
whether a zero or non-zero raster frequency offset,
is used by the eNB.

18. The apparatus of claim 17, wherein the processing circuitry is configured to:
generate a narrowband Master Information Block (NMIB), and
when the single bit indicates that the operation mode is the standalone or guard-band operation mode, indicate in the NMIB which of the standalone and guard-band operation mode is deployed, and
when the single bit indicates the non-zero raster frequency offset is used, indicate in the NMIB which of the in-band or guard-band operation mode is deployed, the standalone operation mode being indicated when the single bit indicates the zero raster frequency offset is used.

19. The apparatus of claim 16, wherein the processing circuitry is configured to:
  encode in a time-domain or frequency-domain cyclic shift of the NSSS one of:
    the raster frequency offset, or
    which of Frequency Division Duplexing (FDD) or Time Division Duplexing (TDD) is used.

20. The apparatus of claim 16, wherein the processing circuitry is configured to:
  encode which of Frequency Division Duplexing (FDD) and Time Division Duplexing (TDD) is used through relative locations of the NPSS and NSSS.

21. A non-transitory computer-readable storage medium that stores instructions for execution by one or more processors of a user equipment (UE), the one or more processors to configure the UE to:
  receive from an evolved NodeB (eNB) a narrowband Primary Synchronization Signal (NPSS) and a narrowband Secondary Synchronization Signal (NSSS), at least one of:
    the NPSS being modulated using a first modulation that indicates via a first single bit one of a duplexing scheme, a raster frequency offset, or an operating mode used by the eNB, or
    the NSSS being modulated using a second modulation that indicates via a second single bit frame timing used by the eNB;
  determine eNB information of the NPSS and NSSS, including information indicated by at least one of the first or second bit; and
  initiate communications with the eNB based on the information of the NPSS and the NSSS, the NSSS comprising a Zadoff Chu (ZC) sequence mapped to multiple orthogonal frequency division multiplexed (OFDM) symbols to form NSSS sequence elements for the OFDM symbols, and the second modulation comprising an OFDM symbol-level modulation of the NSSS sequence elements in which frame timing information is encoded through use of time domain cyclic shifts of the ZC sequence and the OFDM symbol-level modulation, the OFDM symbol-level modulation bearing a one-to-one mapping to a 20 ms timing boundary indicated using different time-domain cyclic shifts of the ZC sequence.

22. The medium of claim 21, wherein:
  the NPSS modulation comprises use of conjugate ZC sequences multiplied by a cover code for each OFDM symbol in a narrowband subframe, and
  the first single bit indicates one of:
    which of Frequency Division Duplexing (FDD) and Time Division Duplexing (TDD),
    which operation mode of:
      an in-band operation mode, or
      a standalone or guard-band operation mode, or
    whether a zero or non-zero raster frequency offset,
  is used by the eNB.

23. The medium of claim 22, wherein the instructions further configure the UE to:
  receive a narrowband Master Information Block (NMIB), and
  when the first single bit indicates that the operation mode is the standalone or guard-band operation mode, indicate in the NMIB which of the standalone and guard-band operation mode is deployed by the eNB, and
  when the first single bit indicates the non-zero raster frequency offset is used, indicate in the NMIB which of the in-band or guard-band operation mode is deployed, the standalone operation mode being indicated when the single bit indicates the zero raster frequency offset is used by the eNB.

24. The medium of claim 21, wherein the one or more processors are configured to at least one of:
  determine from a time-domain or frequency-domain cyclic shift of the NS SS one of:
    the raster frequency offset, or
    which of Frequency Division Duplexing (FDD) or Time Division Duplexing (TDD) is used by the eNB, or
  determine from relative locations of the NPSS and NSSS which of Frequency Division Duplexing (FDD) and Time Division Duplexing (TDD) is used by the eNB.

* * * * *